Inventors
HANS GEORG LUTZ
WALDEMAR G. MENZEL
BY
AGT.

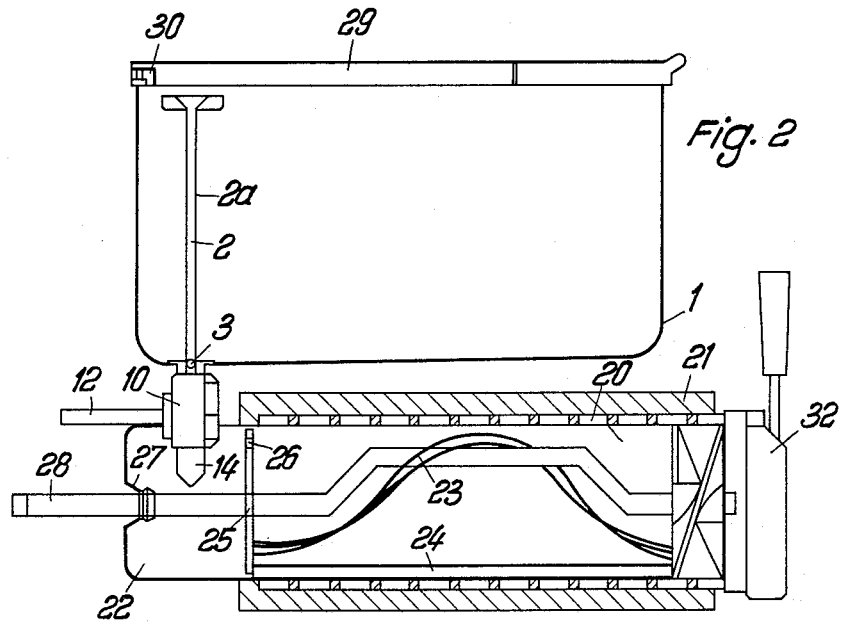
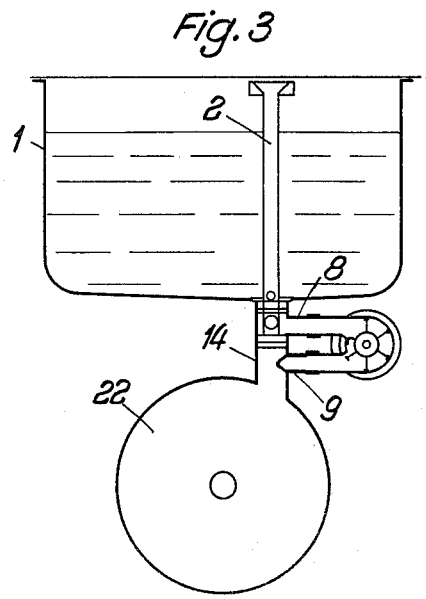 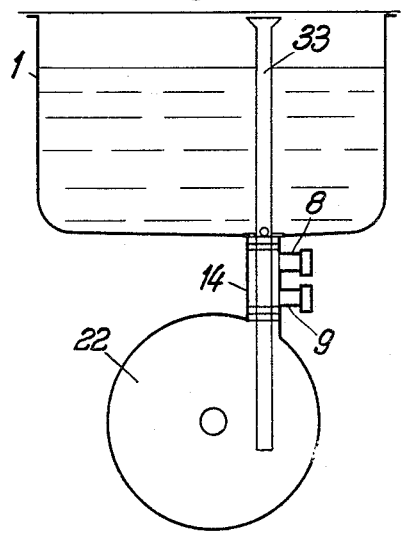

United States Patent Office 3,183,681
Patented May 18, 1965

3,183,681
FOOD ICE FREEZER FOR DISPENSING FOOD ICE IN PORTIONS OUT OF A FREEZING CONTAINER KEPT UNDER PRESSURE
Hans Georg Lutz, Hans-Hacker Strasse 9, Kulmbach, Germany and Waldemar G. Menzel, Haus Nr. 163, Burghaig uber Kulmbach, Germany
Filed Oct. 10, 1962, Ser. No. 229,668
Claims priority, application Germany, Oct. 13, 1961, G 33,326
6 Claims. (Cl. 62—135)

The invention relates to a food ice freezer, particularly of the type which is adapted to freeze and dispense portions of the food ice for immediate consumption.

The food ice freezer in accordance with the invention is arranged for dispensing portions of food ice directly to the consumer out of a freezing compartment which is under raised atmospheric pressure. It is intended to provide, with the simplest possible means, not only for the continuous production of a food ice which is particularly tasty and agreeable owing to the optimum addition of air but also to insure the simultaneous feeding of air and ice mix in predetermined proportions, without encountering the danger of clogging the inlet with thick or lumpy ice mix; this is effected in a manner that the feeding of the mixture of air and ice mix by the feeding pump is controlled by the raised pressure predominating in the freezing container.

The invention relies on a food ice freezer of a type known per se, the freezing container of which is supplied during operation out of a supply container by a centrifugal displacement pump with a mixture of air and ice mix. It is a particular feature of the invention that the operation of the pump is controlled by the pressure prevailing in the freezing container, so that automatic actuation and stopping takes place.

In accordance with the invention the control element for the drive of the pump is a switch means controllable by pressure, the pressure sensing element of which is connected to the pressure prevailing in the freezing container. Suitably this switch means is adjustable for a predetermined lower pressure limit causing the starting and an upper pressure limit causing the stopping, so that the difference between the two pressure limits is adjustable.

The feed pump has an independent drive means and feeds the mixture of air and ice mix produced by the mixing valve until the predetermined pressure in the freezing container is attained. Thereupon the drive of the pump is stopped by the pressure switch connected with the pressure space. As soon as the pressure goes below a predetermined and set minimum value as a result of dispensing mixed food ice, the drive is again cut in by means of the same pressure switch. In this connection the difference between maximum and minimum pressure can preferably be so adjusted that the pump is operated at smaller or greater time intervals.

The magnitude of the pressure in the freezing container is indicated by a pressure indicator installed in the pressure conduit.

In this manner the pump feeds at any time that quantity of air and food ice mix which is required to replace the corresponding quantity of dispensed food ice. In particular, the danger is hereby avoided, which exists in food ice freezers that operate with pumps and overflow valves, that the mixture of ice mix and air which is continuously fed by the steadily running pump can flow back into the supply container through an over-flow valve, so that the amount of air dispersed in the ice mix becomes increasingly larger and the suction relationship between air and ice mix is more and more reduced to unfavorably affect the ice mix, and whereby the consistency and the composition of the food ice produced by this mix is changed in an undesirable manner.

Advantageously the pump is constructed for a feeding pressure that does not exceed a predetermined amount, preferably 2 atmospheres, and its suction and feeding path is unobstructed by over-flow and safety valves, because such valves are then unnecessary.

Contrary to the known types of construction, the invention eliminates or avoids the introduction of air already dispersed in the food ice mix and also the emulsifying effect caused by the known toothed gear pumps. Rather the requirements of the invention are satisfied by feeding air and ice mix as a coarse mixture caused by the suction action, and for this purpose provides an extremely simple mixing member which simultaneously draws in air and ice mix, which hereinafter is referred to as the mixing valve. This is in the form of a riser tube and projects far into the supply container. The pump is provided in the path between this mixing valve and the feeding channel of the freezing container, and that in a manner permitting ready installation and dismantling of the mixing valve without removing the pump.

Accordingly the invention provides the advantage that the pump which has a separate drive means can be stopped at any time, while the food ice freezer is operated by exchanging merely the feed valve in the same manner as any known normal food ice freezer, i.e. without excess pressure.

Further objects and advantages of the invention will become apparent from the following specification with reference to the drawings, in which:

FIG. 2 illustrates the freezing cylinder with the supply container and pump as well as the associated stirring and feeding means with dispensing means, partly in longitudinal section; and FIGS. 3 and 4 show the control means for the replenishing mix from the storage container through the connecting channel into the freezing cylinder.

Figure 1:
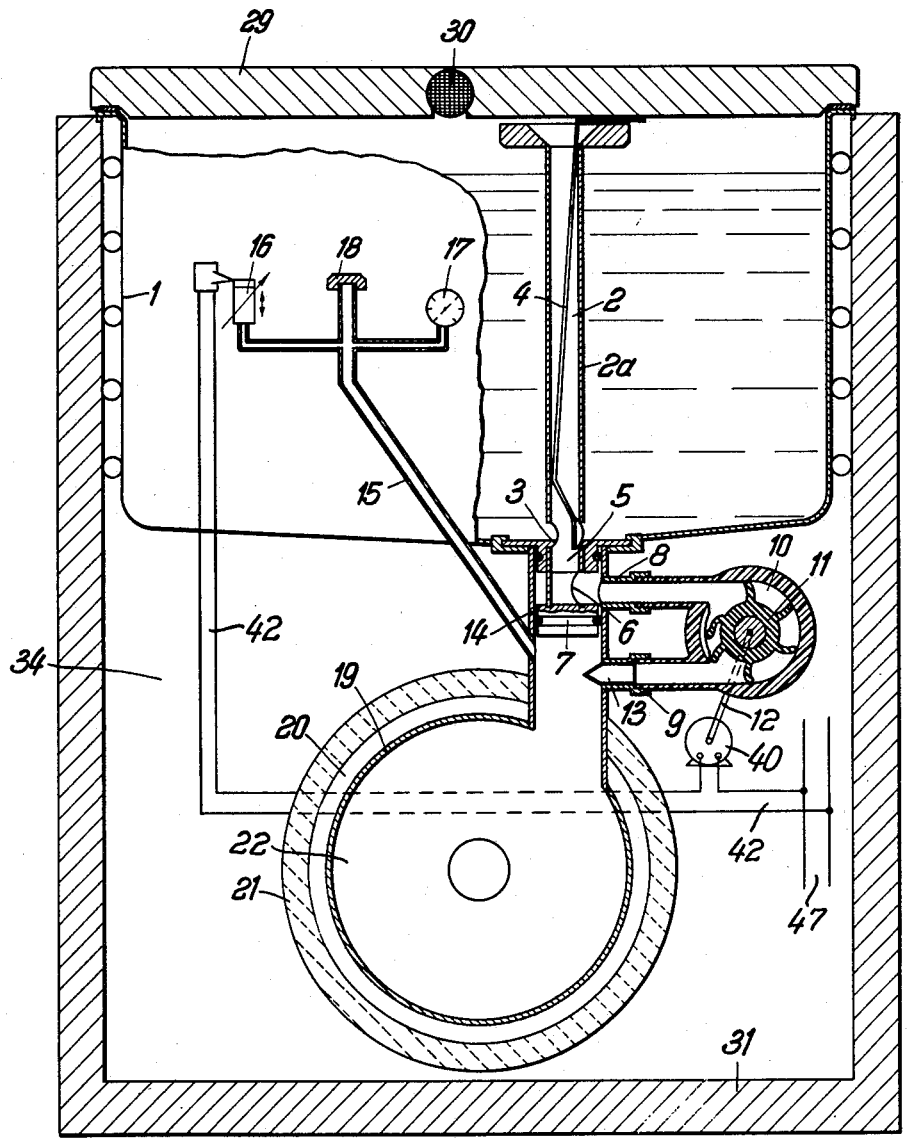
FIG. 1 illustrates in cross-section the supply container, the freezing cylinder and the connecting channel with connecting stub, the mounted pump and the associated control device of a continuously operating food ice mixer in a space closed by a cold restraining insulation mass.

The illustrated food ice freezer has a freezing vessel and a rotating stirring and feeding mechanism and a supply container for food ice mix connected with the freezing vessel through a connecting channel, whereby the mixture of air and ice mix drawn in out of the supply or storage container is fed by a rotating displacement pump under pressure into the rearward end of the freezing vessel, whence it is continuously beaten and frozen to constitute food ice as it reaches the forward end of the freezing vessel, where the ice may then be removed through a suitably formed dispensing aperture, either continuously or in portions, at optimum time intervals.

Advantageously the pump may be a combined centrifugal and displacement pump, or it may be of the type marketed under the trademark "Jabsco-Pump."

Air and ice mix are drawn out of the storage container and are fed under pressure by means of the centrifugal and displacement pump into the air-tight freezing vessel, which is preferably horizontally disposed, and are there frozen to the consistency of food ice. The suction and pressure connections of the pump are both located in the connecting channel which links the supply container with the freezing vessel, with the mixing valve disposed in the connecting channel. This valve comprises a riser tube for supplying air having lateral nozzles for the introduction of the mix, a retaining or supporting disk and a sealing gasket for sealing the suction side of the connecting channel with respect to the pressure side of the connecting channel that leads to the freezing vessel. The pressure connection in the connecting channel is protected by a removable one-way valve serving as a relief valve.

The drawings show the cold supply or storage container 1 which is filled with the ice mix, which may be cooled off if required and is maintained in cooled condition. The container 1 is closed at the upper end by a hinged lid 29 made of a plastic and insulating material and having an exchangeable sterile air filter 30 disposed therein. At the lower end the container 1 is rigidly connected through the connecting channel 14 with the freezing cylinder 19.

The freezing cylinder 19 has a mantle with helically disposed cooling channels 20, which is supplied with a cooling agent and is surrounded by a cold retaining insulating material 21. In the freezing cylinder 19 a rotating stirring and feeding device 23 is provided which has a scraper 24. A chamber 22 is divided off in the freezing cylinder 19 by a disk 25 which is connected to the shaft 28 of the stirring and feeding device, into which chamber the stirring and feeding device does not extend. The shaft 28 is brought out through a rearward aperture on the freezing cylinder 19, is sealed by means of a suction and friction seal 27 and connected by means of a coupling with the drive means. The forward end of the freezing cylinder 19 is closed off by a dispensing device 32 consisting largely of a mass of plastic material, which is therefore at the same time effective as cold retaining insulation, from which the finished food ice is removed.

The mixing valve 2 comprises a riser tube 2a and two disks fastened thereto, a supporting disk 5 and a sealing disk 7. The riser tube 2a extends above the level of mix to be attained in the container 1 and is open at the upper end. At the lower end riser tube 2a is rigidly connected with the sealing disk 7 and is closed by this disk. The riser tube 2a is furthermore rigidly connected with the supporting disk 5 through which it extends. Above this supporting disk 5 the feed nozzles 3 are provided in the wall of the tube which can be closed by inserting the spring rod 4 into the riser tube 2a. The discharge opening 6 is arranged between the supporting disk 5 and the sealing disk 7. The mixing valve 2 is anchored by means of supporting disk 5 with the aid of bayonet coupling or friction means to the supply container 1 or the connecting channel 14 and can readily be withdrawn from the connecting channel 14 by rotation through the upper end of the riser tube. The sealing disk 7 obstructs the direct passage from the supply container 1 through the connecting channel 14 to the freezing cylinder 19 and divides the connecting channel 14 into a suction and a pressure side.

The suction pipe connection 8 and the pressure pipe connection 9 are mounted on the connecting channel 14, and the pump 10 is connected to these pipe connections. If required, the pump 10 draws in the ice mix stored in the supply container 1 through the nozzles 3 and at the same time draws in air by way of the riser tube 2, and thus forces the air and ice mix through the aperture 6 through the one-way valve 13 in the pressure pipe connection 9 and through the upper part of the connecting channel 14 into the chamber 22 of the freezing cylinder 19. The ice mix passes from the chamber 22 through an aperture 26 in the disk 25 on into the actual freezing space of the cylinder 19. By opening or closing the supply nozzles 3 by means of a closure member provided on the spring rod 4, it is possible to change the proportion of the air and ice mix mixture to be drawn in by the pump 10. The pump 10 has an independent drive and feeds the air and ice mix until the desired pressure is attained in the freezing cylinder 19; the drive means is then automatically disconnected by the snap switch 16 as the pressure is attained to which the switch has been set. As soon as the pressure in the freezing cylinder 19 sinks below a predetermined setting, for example, as a result of withdrawing the finished frozen ice food product through the dispensing device 32, the pump is again automatically turned on. In order to prevent escape of the excess atmospheric pressure in the freezing cylinder 19 as the pump 10 is standing still, the one-way valve 13 is provided in the pressure pipe connection 9 so as to prevent the return of the air and ice mix mixture that has been forced in.

The snap switch 16 is connected with the freezing cylinder by way of the pressure tube 15 and can be adjusted for the pressure desired at any particular time in the freezing cylinder 19. In addition the desired difference between stopping and starting pressure is adjustable on the switch 16. The pressure prevailing in the freezing cylinder 19 can be read on the pressure indicator 17 to which the pressure conduit 15 is also connected.

The pump 10 comprises a housing of plastic material and a flexible impeller wheel 11 rotating therein which is driven by the pump drive shaft 12 to which it is secured. The drive shaft 12 is driven by an independent driving means that is automatically controlled by the switch 16. As shown in FIG. 1 of the drawings, this driving means comprises an electric motor 40 supplied with current from the line 41 by way of switch 16 and leads 42. The pump 10 has a threaded lid of plastic material which can be readily opened, and is made of plastic material at least to the extent that it comes in contact with the ice mix.

The connecting channel 14 as well as the suction pipe connection 8 and the pressure pipe connection 9 are so arranged that the air-ice mix supply from the supply container 1 to the chamber 22 of the freezing cylinder 19 can also be controlled in a different manner than by pump 10. By simply exchanging the mixing valve 2 against the normal mixing valve 33 (FIGS. 3 and 4) in the connecting channel 14, it is possible to convert to a manner of operation where the air-ice mix supply to the freezing cylinder 19 takes place without raised pressure and solely through the mixing valve 33 in accordance with the replenishing method already known.

The cooled supply container 1 with the freezing cylinder that is surrounded with its own cold sealing insulation 21 as well as the pump 10 which is provided between the supply container 1 and the freezing cylinder 19 form a unitary structure and are surrounded on all sides by means of cold sealing insulation 31 (FIG. 1), so that a cooled sealed space 34 is formed. In this manner it is accomplished that the ice mix cooled in the supply container 1 and furthermore in all of the conduits and in the pump is kept cold until it reaches the ferezing cylinder 19 and cannot be warmed by the outside temperature, in the event that for a considerable peirod of time no food ice is dispensed. The temperature in the space 34 is determined by the cooling pipes which cool the supply container as well as by the coldness radiated by the freezing cylinder 19. The supply container 1 as well as the freezing cylinder 19 are held automatically at a desired pre-set temperature by means of the freezing assembly.

Having now described our invention with reference to the embodiment illustrated in the drawings, we do not wish to be limited thereto but what we desire to protect by Letters Patent of the United States is set forth in the appended claims.

We claim:

1. Food ice freezer for dispensing food ice in portions directly to the consumer, comprising a freezing container operable under raised atmospheric pressure, a supply container for air and food ice mix, channel means connected between said supply container and said freezing container, said channel means having a first and a second aperture, a sealing disk disposed between said apertures and a one-way valve in said second aperture, a displacement pump connected to said channel means and including pump drive means, said pump having a suction portion connected to said first aperture and an output portion connected to said second aperture and being operative to supply said freezing container with a mixture of air and food ice mix through said one-way valve, and automatically operative control means responsive to the air pressure in said freezing container to start said pump when the air pressure falls below a minimum value and to stop said pump when the air pressure exceeds a maximum value.

2. Food ice freezer for dispensing food ice in portions directly to the consumer, comprising a freezing container operable under raised atmospheric pressure, a supply container for air and food ice mix, channel means connected between said supply container and said freezing container, said channel means having a first and a second aperture, a sealing disk disposed between said apertures and a one-way valve in said second aperture, a displacement pump connected to said channel means and including pump drive means, said pump having a suction portion connected to said first aperture and an output portion connected to said second aperture and being operative to supply said freezing container with a mixture of air and food ice mix through said one-way valve, and automatically operative control means responsive to the air pressure in said freezing container to start said pump when the air pressure falls below a minimum value and to stop said pump when the air pressure exceeds a maximum value, said control means comprising a pressure sensing device responsive to air in said freezing container and a pressure responsive switch device connected to said pump drive means, said switch device including means for adjusting the minimum and the maximum pressure to which said device is responsive.

3. Food ice freezer for dispensing food ice in portions directly to the consumer, comprising a freezing container operable under raised atmospheric pressure, a supply container for air and food ice mix, a channel connecting said supply container and said freezing container, a displacement pump connected to said channel and including pump drive means, said pump being operative to supply said freeding container with a mixture of air and food ice mix, and automatically operative control means responsive to the air pressure in said freezing container to start said pump when the air pressure falls below a minimum value and to stop said pump when the air pressure exceeds a maximum value, said control means comprising a pressure sensing device responsive to air in said freezing container and a pressure responsive switch device connected to said pump drive means, said switch device including means for adjusting the minimum and the maximum pressure to which said device is responsive, a riser tube connected to and extending from said channel into said supply container having an upper end disposed above the normal level of the mix in said supply container, said channel being a tube having a first and a second aperture, said pump having a suction and intake portion connected to said first aperture adjacent the lower end of said riser tube and a pressure and output portion connected to said second aperture adjacent the entrance to said freezing container, and said riser tube constituting a mixing valve slidably received in said channel and having a lateral discharge aperture adjacent said first aperture and having a sealing disk at its lower end separating the suction side and the pressure side of said pump and of said channel.

4. Food ice freezer in accordance with claim 3, wherein said pressure and output portion of said pump includes a one-way valve.

5. Food ice freezer for dispensing food ice in portions directly to the consumer, comprising a freezing container operable under raised atmospheric pressure, a supply container for air and food ice mix, a channel connecting said supply container and said freezing container, a displacement pump connected to said channel and including pump drive means, said pump being operative to supply said freezing container with a mixture of air and food ice mix, and automatically operative control means responsive to the air pressure in said freezing container to start said pump when the air pressure falls below a minimum value and to stop said pump when the air pressure exceeds a maximum value, said control means comprising a pressure sensing device responsive to air in said freezing container and a pressure responsive switch device connected to said pump drive means, said switch device including means for adjusting the minimum and the maximum pressure to which said device is responsive, a riser tube connected to and extending from said channel into said supply container having an upper end disposed above the normal level of the mix in said supply container, said channel being a tube having a first and a second aperture, said pump having a suction and intake portion connected to said first aperture adjacent the lower end of said riser tube and a pressure and output portion connected to said second aperture adjacent the entrance to said freezing container, and said riser tube constituting a mixing valve slidably received in said channel and having a lateral discharge aperture adjacent said first aperture and having a sealing disk at its lower end separating the suction side and the pressure side of said pump and of said channel, and having a lateral intake aperture above said discharge aperture and proximate the bottom of said supply container and a supporting disk extending circumferentially of said tube below said intake aperture for supporting said tube proximate the bottom of said supply container, and having an air intake opening at the upper end thereof, and a closure member for said lateral intake aperture provided on a rod extending downwardly into said tube from said air intake opening.

6. Food ice freezer for dispensing food ice in portions directly to the consumer, comprising a freezing container operable under raised atmospheric pressure, a supply container for air and food ice mix, a channel connecting said supply container and said freezing container, a displacement pump connected to said channel and including pump drive means, said pump being operative to supply said freezing container with a mixture of air and food ice mix, and automatically operative control means responsive to the air pressure in said freezing container to start said pump when the air pressure falls below a minimum value and to stop said pump when the air pressure exceeds a maximum value, said control means comprising a pressure sensing device responsive to air in said freezing container and a pressure responsive switch device connected to said pump drive means, said switch device including means for adjusting the minimum and the maximum pressure to which said device is responsive, a riser tube connected to and extending from said channel into said supply container having an upper end disposed above the normal level of the mix in said supply container, said channel being a tube having a first and a second aperture, said pump having a suction and intake portion connected to said first aperture adjacent the lower end of said riser tube and a pressure and output portion connected to said second aperture adjacent the entrance to said freezing container, and said riser tube constituting a mixing valve slidably received in said channel and having a lateral discharge aperture adjacent said first aperture and having a sealing disk at its lower end separating the suction side and the pressure side of said pump and of said channel, said freezing container, said pump, said supply container and the connections therebetween constituting a unitary structure and a container of insulating material being provided enclosing said unit, said container of insulating material having a cover including a sterile air filter.

References Cited by the Examiner

UNITED STATES PATENTS

| | | | |
|---|---|---|---|
| 2,737,024 | 3/56 | Swenson | 62—342 |
| 2,760,344 | 8/56 | Oltz | 62—136 |
| 2,924,952 | 2/60 | Swenson et al. | 62—342 |
| 2,981,075 | 4/61 | Duke et al. | 62—135 |

ROBERT A. O'LEARY, *Primary Examiner.*

MEYER PERLIN, *Examiner.*